US011908646B2

(12) United States Patent
Meley et al.

(10) Patent No.: US 11,908,646 B2
(45) Date of Patent: Feb. 20, 2024

(54) BREAKING DEVICE FOR A MEDIUM VOLTAGE ELECTRICAL CIRCUIT

(71) Applicant: Schneider Electric Industries SAS, Rueil Malmaison (FR)

(72) Inventors: Jean-Pierre Meley, Saint Ismier (FR); Said Attak, Xiamen (CN); Frédéric Toti-Buttin, Le Pont de Claix (FR); Philippe Picot, Meylan (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/837,374

(22) Filed: Jun. 10, 2022

(65) Prior Publication Data

US 2022/0406541 A1 Dec. 22, 2022

(30) Foreign Application Priority Data

Jun. 16, 2021 (FR) ....................................... 2106358

(51) Int. Cl.
*H01H 33/666* (2006.01)
*H01H 33/664* (2006.01)

(52) U.S. Cl.
CPC ........ *H01H 33/666* (2013.01); *H01H 33/664* (2013.01)

(58) Field of Classification Search
CPC ............... H01H 33/666; H01H 33/664; H01H 33/6664; H01H 33/66; H01H 2033/6667; H01H 1/0015; H01H 11/0062; H01H 2011/0075; H01H 9/16
USPC ......................................... 218/118, 123, 146
See application file for complete search history.

(56) References Cited

U.S. PATENT DOCUMENTS

| | | | | |
|---|---|---|---|---|
| 3,641,359 A | | 2/1972 | McCarty | |
| 3,925,722 A | | 12/1975 | Fohrhaltz et al. | |
| 5,095,293 A | * | 3/1992 | Patel | H01H 1/0015 335/20 |
| 6,002,560 A | | 12/1999 | Nguyen et al. | |

(Continued)

FOREIGN PATENT DOCUMENTS

| | | |
|---|---|---|
| CN | 2879397 Y | 3/2007 |
| CN | 201522959 U | 7/2010 |

(Continued)

OTHER PUBLICATIONS

French Search Report and Written Opinion dated Feb. 16, 2022 for corresponding French Patent Application No. FR2106358, 8 pages.

*Primary Examiner* — William A Bolton
(74) *Attorney, Agent, or Firm* — Locke Lord LLP

(57) ABSTRACT

A device for switching a medium-voltage electrical circuit, including: a vacuum interrupter including a mobile electrode, an actuating lever linked to the mobile electrode and mobile between an opening position and a closing position, an insulator linked to the actuating lever, a control fitting secured to the mobile electrode, and an elastic return, for example, a spring, exerting a return force between the control fitting and the insulator, wherein a travel of displacement of the actuating lever is greater than the opening distance such that the control fitting is distanced from the insulator when the actuating lever is in the closing position. The switching device further including an indicator stem secured to the control fitting, which is configured to extend at least partly out of the insulator when the actuating lever is in the closing position.

12 Claims, 6 Drawing Sheets

(56) References Cited

U.S. PATENT DOCUMENTS

| | | | | | |
|---|---|---|---|---|---|
| 6,150,625 | A * | 11/2000 | Marchand | H01H 1/0015 | 218/118 |
| 8,492,667 | B2 * | 7/2013 | Stelter | H01H 9/16 | 218/154 |
| 8,952,826 | B2 * | 2/2015 | Leccia | H01H 33/6662 | 218/123 |
| 9,218,923 | B2 * | 12/2015 | Johansson | H01H 73/12 | |
| 9,633,808 | B2 * | 4/2017 | Ricciuti | H01H 1/0015 | |
| 2007/0278187 | A1 * | 12/2007 | Siebens | H01H 33/666 | 218/118 |
| 2009/0077793 | A1 * | 3/2009 | Schreiber | H01H 33/666 | 29/622 |
| 2016/0141136 | A1 | 5/2016 | Ashtekar et al. | | |
| 2017/0263401 | A1 | 9/2017 | Huo et al. | | |

FOREIGN PATENT DOCUMENTS

| | | | |
|---|---|---|---|
| CN | 202405192 | U | 8/2012 |
| CN | 103439094 | A | 12/2013 |
| CN | 102074408 | B | 4/2015 |
| CN | 204905144 | U | 12/2015 |
| CN | 204905172 | U | 12/2015 |
| CN | 105374622 | A | 3/2016 |
| CN | 102522269 | B | 8/2016 |
| CN | 106783374 | A | 5/2017 |
| CN | 106783375 | A | 5/2017 |
| CN | 105070601 | B | 7/2017 |
| CN | 206480552 | U | 9/2017 |
| CN | 206480553 | U | 9/2017 |
| CN | 105470037 | B | 8/2018 |
| CN | 106449265 | B | 12/2018 |
| CN | 209232662 | U | 8/2019 |
| CN | 106531480 | B | 1/2020 |
| DE | 2640921 | A1 | 3/1978 |
| DE | 4241926 | A1 | 6/1993 |
| EP | 1653492 | B1 | 2/2009 |
| JP | 4174922 | A | 6/1992 |
| WO | 200800105 | A1 | 1/2008 |
| WO | 201944071 | A1 | 3/2019 |

* cited by examiner

BREAKING DEVICE FOR A MEDIUM VOLTAGE ELECTRICAL CIRCUIT

TECHNICAL FIELD

The present invention relates to the field of medium-voltage current-switching devices, that is to say for voltages higher than 1 kV and generally ranging up to 52 kV, and currents of the order of 1000 to 3000 amperes. In particular, the invention relates to switching devices (or circuit-breaking devices) in which current switching is performed by opening a vacuum interrupter arranged in series with a main branch of an electrical circuit.

PRIOR ART

The vacuum interrupter comprises a mobile electrode linked to a control rod. The control rod is linked to a control lever. The control lever is mobile between two end positions defining a constant travel of actuation. In the two end positions, the control lever is locked and then unlocked according to the expected action: opening or closing the switching device. By actuating the control lever, the rod is moved and separates the mobile electrode from the fixed electrode or moves them together, which opens or closes the electrical circuit.

When the circuit is closed, sufficient contact pressure has to be ensured between the two electrodes of the vacuum interrupter, in order to resist the repelling forces present between them due to the flow of the current.

To ensure this contact pressure, at least one spring is present in the kinematic linkage between the control lever and the rod, and the travel of the control lever is greater than the minimum travel for ensuring contact between the electrodes of the vacuum interrupter. The overtravel therefore allows the spring to be compressed and a desired minimum contact pressure thus to be applied. This overtravel occurs in the linkage between the control lever and the control rod. In addition, the travel required to obtain contact between the electrodes of the vacuum interrupter changes over time, due in particular to the erosion of the contacts, and to wear in the mechanism over the use of the switching device. As a result, the compression of the spring generating the contact pressure changes as well, resulting in the contact pressure changing over the life of the product.

In order to be able to notify of the need to carry out a maintenance operation on the equipment or to replace it, it is important to be able to determine the pressure between the electrodes of the vacuum interrupter throughout the use of the product. The overtravel between the control lever and the control rod is directly correlated with the contact pressure. It is therefore important to be able to monitor this overtravel. For this reason, some manufacturers choose to arrange the spring between the control lever and the control rod. This arrangement facilitates access to and visibility of said overtravel out of the live region, and makes it straightforward to install a position sensor to monitor the overtravel in question.

However, it is advantageous to be able to minimize the weight of the moving parts of the switching device that are arranged between the contact pressure spring and the mobile contact, in order to obtain better circuit opening performance. Some manufacturers then choose to arrange the spring at the control rod, allowing the desired contact pressure to be generated as close as possible to the mobile electrode. The overtravel allowing the depression of the spring is then no longer apparent, which makes it no longer straightforward to install a position sensor.

The aim of the invention is to provide a solution that makes it possible to minimize the weight of the moving parts while still making it possible to easily monitor the overtravel throughout the use of the switching device.

SUMMARY

To that end, the invention provides a device for switching a medium-voltage electrical circuit, comprising:

- a vacuum interrupter comprising a fixed electrode and a mobile electrode,
- an actuating lever linked to the mobile electrode, the actuating lever being mobile between a first position, called the opening position, in which the mobile electrode and the fixed electrode are separated by an opening distance, and a second position, called the closing position, in which the mobile electrode and the fixed electrode are in contact so as to allow a current to flow through the electrical circuit,
- the actuating lever moving from the first position to the second position defining a travel of displacement,
- an insulator linked to the actuating lever,
- a compression means, exerting a repelling force between the mobile electrode and the insulator,
- in which the travel of the actuating lever is greater than the opening distance, the switching device comprising:
- an indicator stem mechanically linked to the mobile electrode, which is configured to extend at least partly out of the insulator when the actuating lever is in the closing position.

Since the indicator stem is linked to the mobile electrode, the position of the indicator stem is representative of the position of the mobile electrode. The position of the indicator stem is readily determinable, because at least part of said indicator stem is situated outside the insulator and is therefore readily accessible. It is thus possible to easily determine the position of the mobile electrode. It is thus possible to check that the amplitude of the movement allows sufficient contact pressure to be applied between the electrodes of the vacuum interrupter. In the case that this contact pressure is insufficient, due to erosion of the electrode contacts, a warning signal may be triggered. A corrective action may also be taken. For example, the switching device may potentially be adjusted in order to return to a sufficient amplitude of movement of a control fitting mechanically linked to the mobile electrode.

The features listed in the following paragraphs may be implemented independently of one another or in any technically possible combination:

The indicator stem is configured to indicate a distance between the mobile electrode and the insulator.

The indicator stem is configured to indicate an overtravel of the actuating lever with respect to the opening distance between the fixed electrode and the mobile electrode.

According to one embodiment, the indicator stem is rigidly linked to the mobile electrode.

Preferably, the indicator stem is electrically insulated from the mobile electrode.

According to one embodiment of the switching device, the indicator stem is electrically insulating.

The indicator stem is made of epoxy resin, or of polyester.

According to one embodiment, the switching device comprises a control fitting secured to the mobile electrode, and the compression means exerts a repelling force between the control fitting and the insulator so as to press the control fitting against the insulator when the mobile electrode is separated from the fixed electrode.

The compression means is an elastic return means. For example, the compression means is a spring. The spring may be a helical spring.

The mobile electrode is mobile in translation along a longitudinal axis.

The actuating lever is mobile in rotation about a transverse axis. The transverse axis is perpendicular to the longitudinal axis.

The insulator comprises a compartment for accommodating the control fitting.

The accommodating compartment extends along the longitudinal axis.

The compression means exerts a return force between the control fitting and the insulator so as to press the control fitting against a stop in the accommodating compartment when the mobile electrode is separated from the fixed electrode.

The compression means is a helical spring extending along the longitudinal axis.

The stop comprises an orifice for the movement of the control fitting.

The stop extends transversally to the longitudinal axis.

The control fitting comprises a shoulder configured to bear against the stop.

According to one embodiment of the switching device, the insulator extends along a longitudinal axis, and the indicator stem is parallel to the longitudinal axis.

According to one implementation of the switching device, the indicator stem passes through the insulator.

For example, the indicator stem is accommodated in a movement channel in the insulator.

The indicator stem is coaxial with the insulator.

The switching device may comprise a seal that is radially included between the indicator stem and the movement channel in the insulator.

The seal may be an O-ring.

The O-ring is compressed between the indicator stem and the movement channel in the insulator. The compression is greater than or equal to 5%.

The seal may be a lip seal. The seal is, for example, a quad ring.

The movement channel is coaxial with the insulator.

The movement channel comprises a first cylindrical portion with a first diameter. The channel comprises a second cylindrical portion with a second diameter, the second diameter of the second cylindrical portion being greater than the first diameter of the first cylindrical portion.

The indicator stem comprises a seal that is radially included between the indicator stem and the second cylindrical portion.

According to one implementation, the switching device comprises two seals that are radially included between the indicator stem and the second cylindrical portion, the two seals being axially offset along the indicator stem.

The indicator stem comprises a first cylindrical portion with a third diameter, and a second cylindrical portion with a fourth diameter, the fourth diameter being greater than the third diameter.

The second cylindrical portion of the movement channel opens into the compartment for accommodating the compression means.

The compression means surrounds the second cylindrical portion of the movement channel.

According to one embodiment of the switching device, the insulator is linked to a control plate comprising a pivot extending along an axis transverse to the longitudinal axis,

- the actuating lever is linked to the pivot of the control plate,
- the insulator is linked to the control plate by a screw-nut adjustment system configured to adjust the relative position of the insulator with respect to the control plate, so as to adjust the opening distance between the mobile electrode and the fixed electrode when the actuating lever is in the first position,
- and the indicator stem passes through the screw-nut adjustment system.

The insulator is arranged between the mobile electrode and the adjustment system.

According to one embodiment of the switching device, the indicator stem is radially exterior to the insulator.

The indicator stem may comprise a cylindrical portion and a set of fins extending transversally to the cylindrical portion.

The fins are disc-shaped.

The fins are offset along the cylindrical portion of the indicator stem.

The distance between two consecutive fins is constant.

The indicator stem is connected to the control fitting by a linking bar.

The linking bar extends in the transverse direction.

For example, the linking bar and the indicator stem form a one-piece assembly.

According to one embodiment of the switching device, the indicator stem passes through a guide plate.

The guide plate extends transversally to the indicator stem.

The guide plate is fastened to the control plate.

According to one implementation, a portion of the indicator stem faces a position sensor that is rigidly linked to the control plate.

The indicator stem comprises a magnetic target.

The magnetic target is arranged at an axial end of the indicator stem.

The magnetic target is a permanent magnet.

The position sensor is a Hall effect sensor.

An axial end of the indicator stem is flush with an edge of an orifice for the movement of the indicator stem when the actuating lever is in the opening position.

BRIEF DESCRIPTION OF THE DRAWINGS

Other features, details and advantages will become apparent from reading the description provided below and from examining the appended drawings, in which.

DESCRIPTION OF THE EMBODIMENTS

For the sake of the legibility of the figures, the various elements have not necessarily been shown to scale. In the figures, elements that are identical have been designated with the same references. Certain elements or parameters may be indexed, i.e. designated for example by first element or second element, or even first parameter and second parameter, etc. The aim of this indexing is to differentiate between elements or parameters that are similar but not identical. This indexing does not imply that one element or parameter takes priority over another; it is possible to interchange the denominations. When it is specified that a subsystem comprises a given element, this does not exclude the presence of other elements in this subsystem. Similarly, when it is specified that a subsystem comprises a given element, it is understood that the subsystem comprises at least this element.

Figure 1:
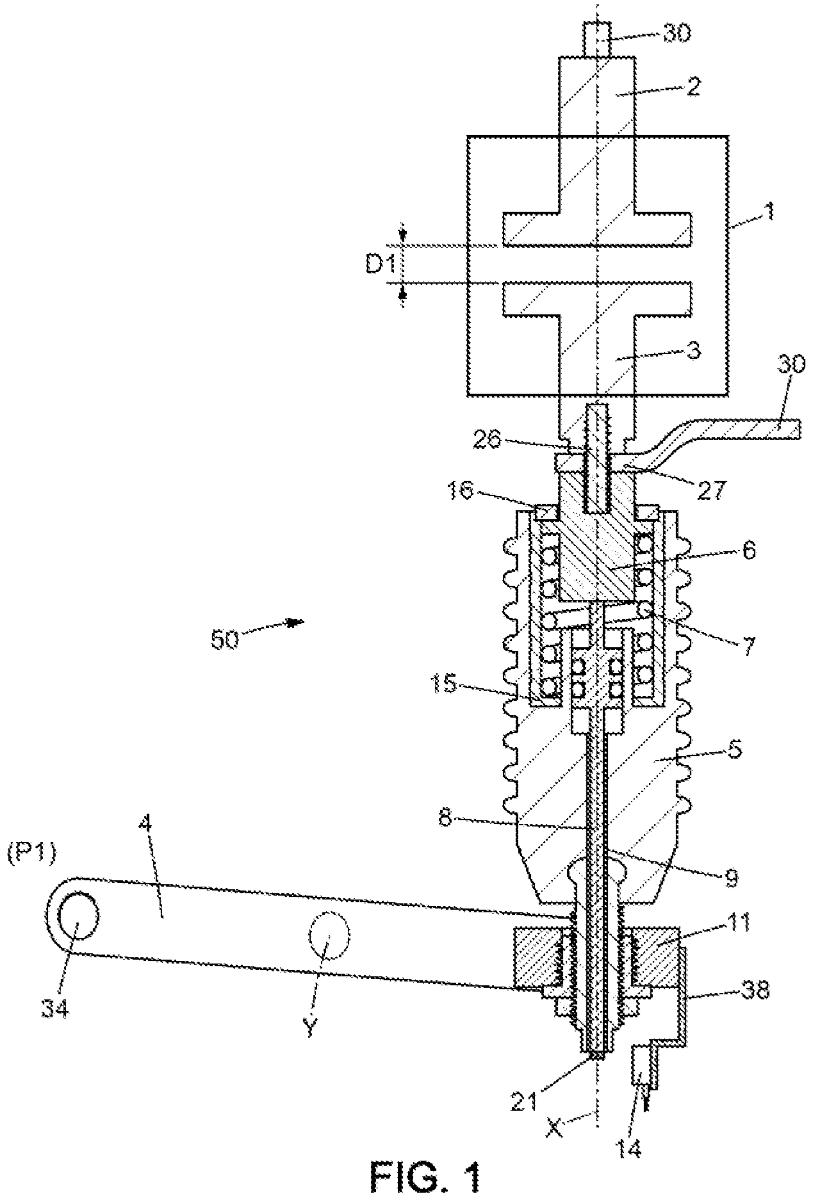
FIG. 1 is a view in cross section of a switching device according to a first embodiment of the invention.

FIG. 1 shows a switching device 50 for switching a medium-voltage, i.e. from 1 to 52 kV, electrical circuit 30. The switching device 50 comprises a vacuum interrupter 1 arranged in series in an electrical circuit 30.

The vacuum interrupter 1 comprises a fixed electrode 2 and a mobile electrode 3. The fixed electrode 2 extends along a longitudinal, X-axis. The fixed electrode 2 and the mobile electrode 3 are coaxial. Each electrode 2,3 comprises a disc-shaped portion extending transversally to the longitudinal, X-axis. The disc-shaped portion of the mobile electrode 3 may be in contact with the disc-shaped portion of the fixed electrode 2, so as to allow a current to flow between the electrodes, and therefore through the vacuum interrupter 1. The mobile electrode 3 is mobile in translation along the longitudinal, X-axis.

An actuating lever 4 allows the opening and closing of the vacuum interrupter 1, and therefore of the electrical circuit 30, to be controlled. The actuating lever 4 is mobile in translation about a transverse, Y-axis. The transverse, Y-axis is perpendicular to the longitudinal, X-axis.

Figure 7:
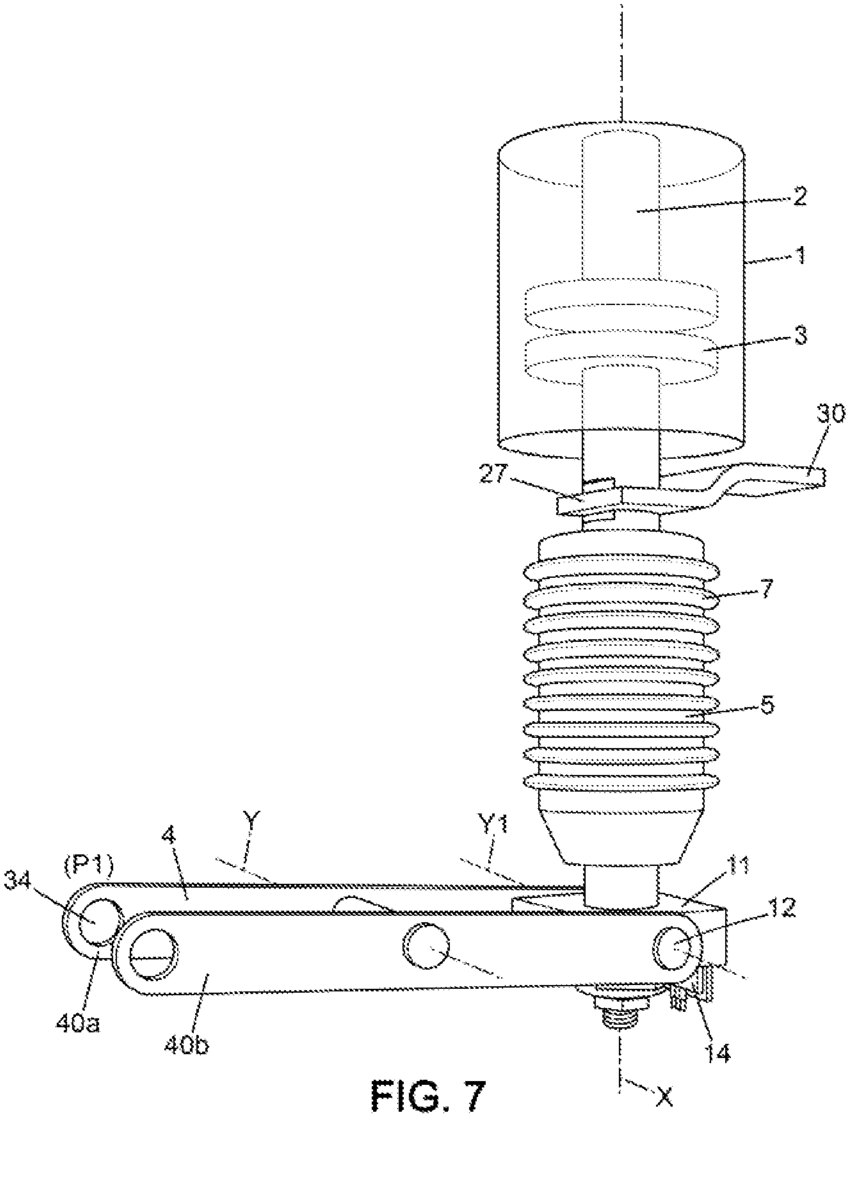
FIG. 7 is a view in perspective of a switching device according to the first embodiment of the invention.

A control plate 11 comprises a pivot 12 extending along an axis Y1 transverse to the longitudinal, X-axis. The actuating lever 4 is linked to the pivot 12 of the control plate 11. An insulator 5 is secured to the control plate 11. More precisely, the insulator 5 is rigidly linked to the control plate 11. The insulator 5 insulates the control plate 11 from the voltage of the electrical circuit 30. The actuating lever 4 comprises two parallel arms 40*a*, 40*b* connected to one another. FIG. 7 details this aspect of the device.

The present invention provides a device 50 for switching a medium-voltage electrical circuit 30, comprising:

- a vacuum interrupter 1 comprising a fixed electrode 2 and a mobile electrode 3,
- an actuating lever 4 linked to the mobile electrode 3, the actuating lever 4 being mobile between a first position, called the opening position P1, in which the mobile electrode 3 and the fixed electrode 2 are separated by an opening distance D1, and a second position, called the closing position P2, in which the mobile electrode 3 and the fixed electrode 2 are in contact so as to allow a current to flow through the electrical circuit 30,
- the actuating lever 4 moving from the first position P1 to the second position P2 defining a travel of displacement C1,
- an insulator 5 linked to the actuating lever 4,
- a compression means 7, exerting a repelling force between the mobile electrode 3 and the insulator 5,
- in which the travel C1 of the actuating lever 4 is greater than the opening distance D1, the switching device comprising:
- an indicator stem 8 mechanically linked to the mobile electrode 3, which configured to extend at least partly out of the insulator 5 when the actuating lever 4 is in the closing position P2.

The difference between the travel C1 of the actuating lever 4 and the opening distance D1 is called the overtravel. This overtravel allows there to be contact pressure between the fixed electrode 2 and the mobile electrode 3. The travel C1 of the actuating lever 4 is greater than the opening distance D1 such that the mobile electrode 3 is distanced from the isolator 5 when the actuating lever 4 is in the closing position P2. What is understood by the term "distanced" is that the distance along the X-axis between the mobile electrode 3 and the insulator 5 is different when the actuating lever 4 is in the closing position P2 and when the actuating lever 4 is in the opening position P1.

Figure 2:
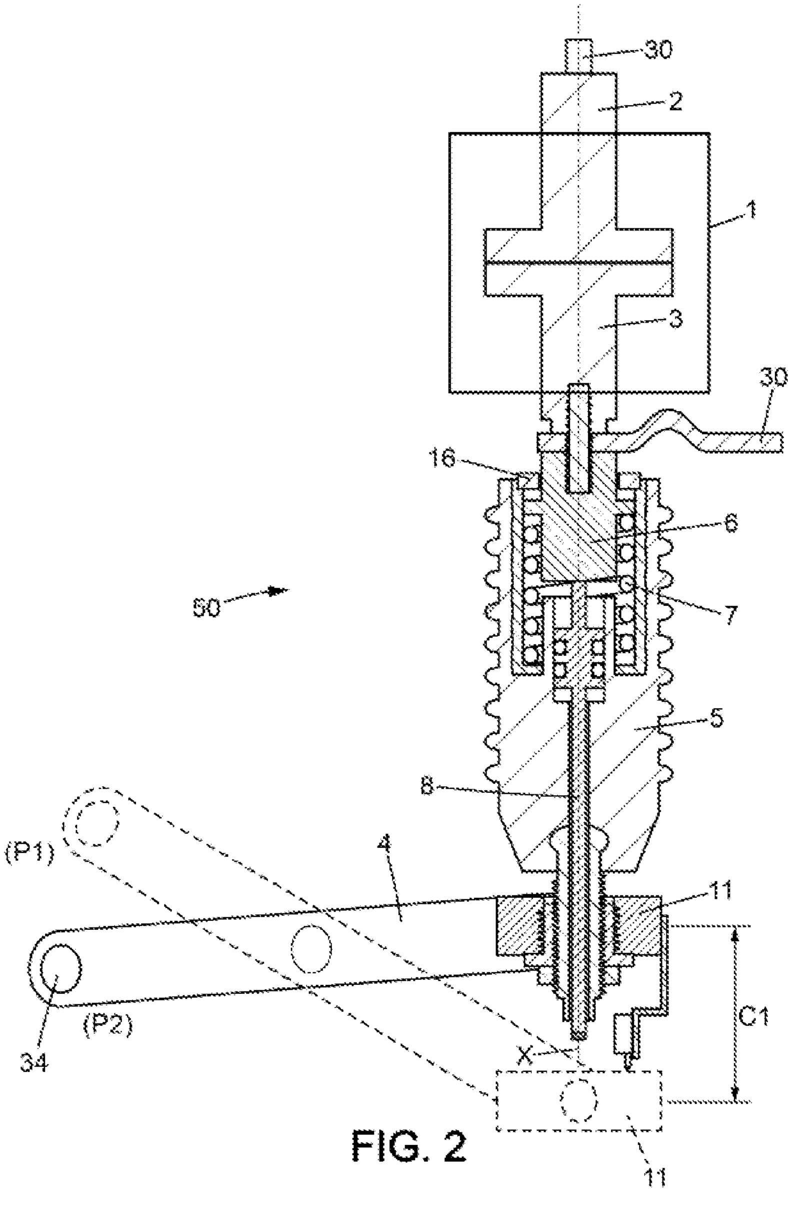
FIG. 2 is another view in cross section of the switching device of FIG. 1.

The opening distance D1 between the electrodes of the vacuum interrupter 1 is referenced in FIG. 1. The travel C1 of the actuating lever 4 is referenced in FIG. 2. FIG. 1 corresponds to the opening position P1 of the actuating lever 4, and FIG. 2 corresponds to the closing position P2. The amplitude of motion of the actuating lever 4 has been exaggerated in order to simplify the depiction. When closing the electrical circuit 30, the actuating lever 4 pivots about the Y-axis under the effect of a control bar (not shown), which is inserted through a void 34 in the actuating lever 4. The control bar thus passes through each of the arms 40*a*, 40*b* of the actuating lever 4. The amplitude of movement C1 of the lever 4 is determined by the construction of the control bar mechanism. This amplitude of movement C1 is fixed. The amplitude of movement C1 of the actuating lever 4 is chosen to be greater than the travel required to bring the mobile electrode 3 and the fixed electrode 2 into proximity. Thus, the movement of the actuating lever 4 from the opening position P1 to the closing position P2 allows the compression means 7 to be compressed. Of course, other types of kinematic linkages between the control bar and the actuating lever 4 may be implemented. The opening distance D1 is between 8 millimetres and 20 millimetres.

Since the indicator stem 8 is linked to the mobile electrode 3, the position of the indicator stem 8 is representative of the position of the mobile electrode 3. The position of the indicator stem 8 may be readily determined, because at least part of said indicator stem 8 is situated outside the insulator 5 and is therefore readily accessible. It is thus possible to easily determine the position of the mobile electrode 3. The indicator stem 8 is configured to indicate an overtravel S of the actuating lever 4 with respect to the opening distance D1 between the fixed electrode 2 and the mobile electrode 3. Based on this information, it is possible to check that the amplitude of movement of the actuating lever 4 allows sufficient compression of the compression means 7, and therefore allows sufficient contact pressure to be applied between the electrodes 2, 3 of the vacuum interrupter 1. Any decrease in overtravel S over the service life of the product is thus measurable. In the case that this contact pressure is insufficient, in particular due to erosion of the contacts of the electrodes 2, 3 over the use of the switching device 50, a warning signal may be triggered. A corrective action may also be taken. For example, the switching device may potentially be adjusted in order to return to a sufficient overtravel, allowing adequate contact pressure.

The indicator stem 8 is configured to indicate a distance between the mobile electrode 3 and the insulator 5, this distance being equal to the overtravel S. The distance between the mobile electrode 3 and the insulator 5 is measured along the X-axis of the mobile electrode 3 of the vacuum interrupter 1.

In the examples shown, the indicator stem 8 is rigidly linked to the mobile electrode 3. What is understood by "rigidly linked" is that the relative positioning of the indicator stem 8 and of the mobile electrode 3 is invariant under mechanical loads representative of normal use of the switching device 50. A kinematic linkage comprising at least one joint is also conceivable.

The indicator stem 8 is electrically insulated from the mobile electrode 3. In the examples shown, the indicator stem 8 is electrically insulating. The indicator stem 8 is, for example, made of thermoplastic material. The indicator stem 8 may, for example, also be made of epoxy resin, or of polyester. The insulator 5 extends along a longitudinal, X-axis, and the indicator stem 8 is parallel to the longitudinal, X-axis. The diameter of the indicator stem 8 is between 2 and 5 millimetres.

According to the embodiments illustrated, the switching device 50 comprises a control fitting 6 secured to the mobile electrode 3, and the compression means 7 exerts a repelling force between the control fitting 6 and the insulator 5 so as to press the control fitting 6 against the insulator 5 when the mobile electrode 3 is separated from the fixed electrode 2. More precisely, the compression means 7 exerts a repelling force between the control fitting 6 and the insulator 5 so as to press the control fitting 6 against the stop 16 when the mobile electrode 3 is separated from the fixed electrode 2.

The compression means 7 is an elastic return means. The compression means 7 is here a spring. More precisely, the compression means 7 is here a helical spring. In the example illustrated, the compression means 7 is here a helical spring extending along the longitudinal, X-axis. According to one variant (not shown), the compression means may be a stack of Belleville washers, or any other conceivable compression means.

The insulator 5 comprises a compartment 15 for accommodating the control fitting 6. The control fitting 6 is accommodated in the accommodating compartment 15. The accommodating compartment 15 extends along the longitudinal, X-axis.

The compression means 7 exerts a return force between the control fitting 6 and the insulator 5 so as to press the control fitting 6 against a stop 16 in the accommodating compartment 15 when the mobile electrode 3 is separated from the fixed electrode 2. In other words, when the mobile electrode 3 applies no force to the fixed electrode 2, the control fitting 6 is pushed by the spring 7 against the stop 16. This configuration is illustrated in FIG. 1.

The stop 16 may be a part added and fastened to the insulator 5. The stop 16 comprises an orifice 29 for the movement of the control fitting 6. The stop 16 is in the general shape of an annular crown with an orifice at the centre thereof. The stop 16 extends transversally to the longitudinal, X-axis.

The control fitting 6 comprises a shoulder 28 configured to bear against the stop 16. The control fitting 6 is secured to the mobile electrode 3 by a threaded element 26. Other fastening means are possible for securing the mobile electrode 3 and the control fitting 6 together. An electrical connection terminal 27 of the electrical circuit 30 is arranged between the control fitting 6 and the mobile electrode 3. In the example shown in the various figures, the threaded element 26 passes through the electrical connection terminal 27.

When closing the electrical circuit 30, the actuating lever 4 pivots about the Y-axis. The mobile electrode 3 therefore moves closer to the fixed electrode 2. Throughout the phase in which there is a distance present between the mobile electrode 3 and the fixed electrode 2, the compression means 7 keeps the control fitting 6 pressed against the stop 16. Once the lever 4 has moved far enough, the mobile electrode 3 comes into contact with the fixed electrode. The movement of the lever 4 continues.

The degree of compression of the compression means 7 increases progressively as the actuating lever 4 moves from the position in which the fixed electrode 2 comes into contact with the mobile electrode 3 to the position corresponding to the maximum travel of the actuating lever 4. The control fitting 6 stops being pressed against the stop 16 and moves away therefrom in the direction of the longitudinal, X-axis. The rest of the travel of movement of the lever 4 compresses the compression means 7. The amplitude of the compressing travel determines the load applied by the compression means 7, and therefore the contact pressure present between the fixed electrode 2 and the mobile electrode 3 once the actuating lever 4 has reached its position of maximum movement P2. The compression means 7 may be in a state in which it is compressed with respect to the free length thereof when the control fitting 6 is bearing against the stop 16. This initial preload allows the potential energy stored in the variation in compression provided by the overtravel of the actuating lever 4 to be increased. Preferably, the overtravel S is between 2 and 5 millimetres.

The control fitting 6 is distanced from the stop 16 when the actuating lever 4 is in the closing position P2.

In the present configuration, the actuating lever 4 is linked to a control plate 11, which is itself linked to the insulator 5. The mobile electrode 3 is linked to the control fitting 6, and a compression means 7 bears against the insulator 5 and against the control fitting 6. This configuration allows the weight of the moving parts secured to the mobile electrode 3 to be minimized. Thus, when opening the vacuum interrupter, the elastic energy stored in the compression means 7 is rendered at a lower weight than in some solutions chosen by some manufacturers, which allows the mobile electrode 3 to be given better momentum. The opening of the electrical circuit 30 is thus more reliably ensured.

According to a first embodiment, illustrated in FIGS. 1 to 4, the indicator stem 8 passes through the insulator 5.

Figure 3:
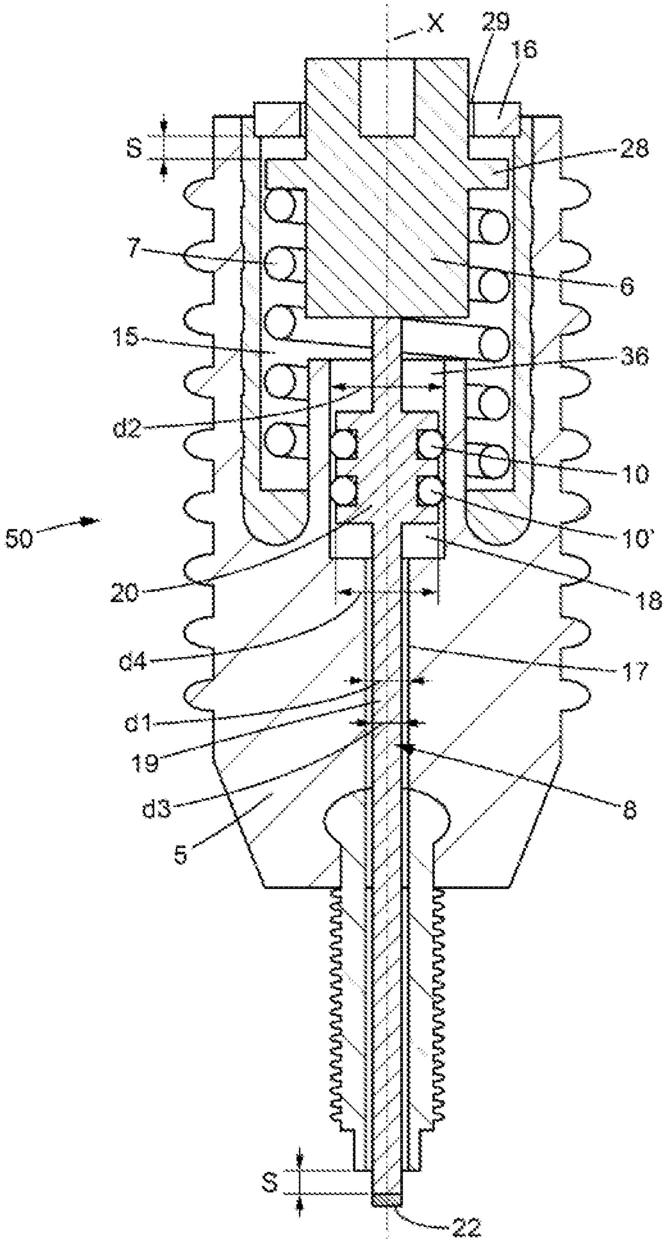
FIG. 3 is a partial view in cross section of the switching device of FIG. 1.

For that, and as detailed in FIG. 3 in particular, the indicator stem 8 is accommodated in a movement channel 9 in the insulator 5. The movement channel 9 is here coaxial with the insulator 5. The indicator stem 8 is thus, in this first embodiment, coaxial with the insulator 5.

As detailed in FIG. 3, the switching device 50 may comprise a seal 10 that is radially included between the indicator stem 8 and the movement channel 9 in the insulator 5. The seal 10 is here an O-ring. The O-ring is compressed between the indicator stem 8 and the movement channel 9 in the insulator 5. The compression is greater than or equal to 5%. What is understood by "compression of the seal" is the quotient of the difference between the diameter of the seal in the free state and the diameter of the seal in the state when mounted in the movement channel 9, and the diameter of the seal in the free state. In other words, the compression of the seal is the quantity (free diameter−mounted diameter)/free diameter. According to one variant (not shown), the seal 10 may be a lip seal. The seal 10 is, for example, a quad ring. The seal 10 improves the electrical insulation between the mobile electrode 3 and the end of the stem 8 opposite the mobile electrode 3. Specifically, the seal 10 limits the risk of an electric arc tracking along the movement channel 9.

More precisely, the movement channel 9 comprises a first cylindrical portion 17 with a first diameter d1. The channel comprises a second cylindrical portion 18 with a second diameter d2, the second diameter d2 of the second cylindrical portion 18 being greater than the first diameter d1 of the first cylindrical portion 17. The diameter d1 is between 3 and 8 millimetres. The second diameter d2 is between 5 and 20 millimetres.

The indicator stem 8 comprises a seal 10 that is radially included between the indicator stem 8 and the second cylindrical portion 18. More specifically, and as detailed in FIG. 4, the switching device 50 comprises two seals 10, 10' that are radially included between the indicator stem 8 and the second cylindrical portion 18, the two seals 10, 10' being axially offset along the indicator stem 8. The presence of two seals in succession allows electrical insulation to be improved further still. As one variant, three or more seals may be arranged in succession along the axis of the stem 8. As another variant, it is possible to have just one seal. The indicator stem 8 comprises a first cylindrical portion 19 with a third diameter d3, and a second cylindrical portion 20 with a fourth diameter d4, the fourth diameter d4 being greater than the third diameter d3. The second portion 20 of the indicator stem 8 forms a shoulder of the stem 8.

The second cylindrical portion 18 of the movement channel 9 opens into the compartment 15 for accommodating the compression means 7. Thus, an axial end 36 of the movement channel 9 opens into the accommodating compartment 15. In this first embodiment, the compression means 7 surrounds the second cylindrical portion 19 of the movement channel 9.

The insulator 5 is linked to a control plate 11 comprising a pivot 12 extending along an axis Y1 transverse to the longitudinal axis X,

- the actuating lever 4 is linked to the pivot 12 of the control plate 11,
- the insulator 5 is linked to the control plate 11 by a screw-nut adjustment system 35 configured to adjust the relative position of the insulator 5 with respect to the control plate 11, so as to adjust the opening distance D1 between the mobile electrode 3 and the fixed electrode 2 when the actuating lever 4 is in the first position P1. The adjustment system 35 is detailed in FIG. 4. The indicator stem 8 passes through the screw-nut adjustment system 35. More precisely, the adjustment system 35 allows the contact overtravel S to be adjusted.

The insulator 5 is arranged between the mobile electrode 3 and the adjustment system 35. The adjustment system 35 comprises an externally tapped sheath 23 that is configured to be moved inside a threaded bore 24 linked to the control plate 11, and comprises a nut 25 that is configured to lock the sheath 23 in position. The adjustment system 35 thus allows the contact overtravel S to be adjusted, and thereby the distance D1 separating the electrodes 2, 3 of the vacuum interrupter 1 when the actuating lever 4 is in the opening position P1.

Figure 5:
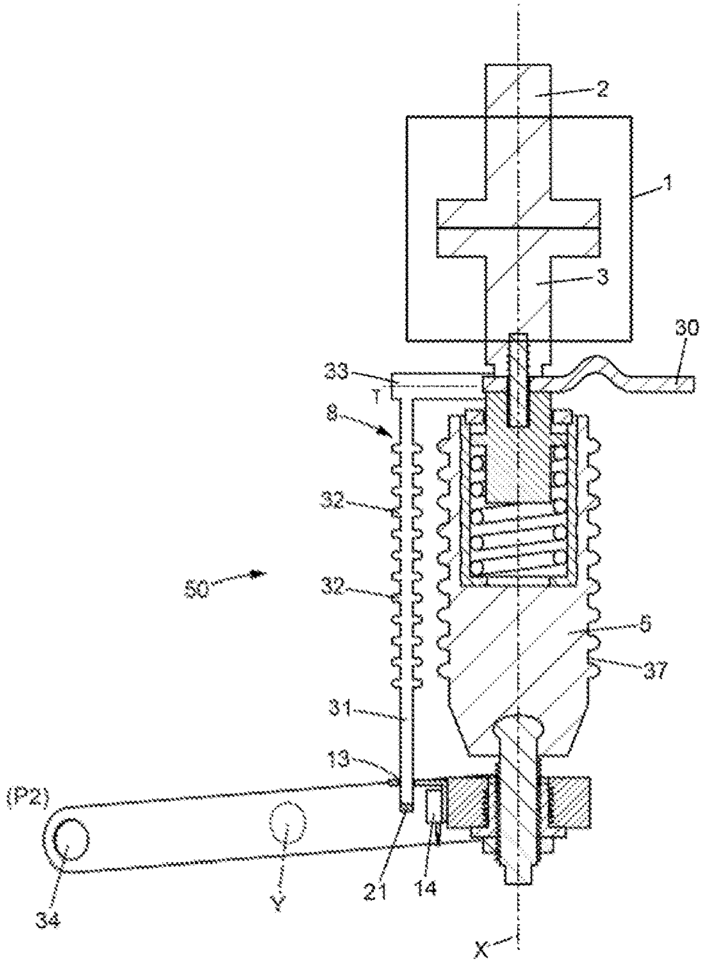
FIG. 5 is a view in cross section of a switching device according to a second embodiment of the invention.
Figure 6:
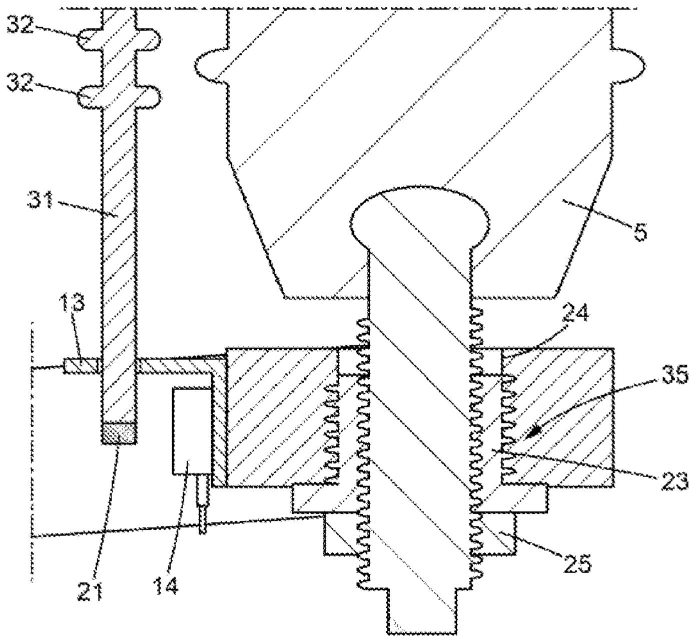
FIG. 6 is a partial view in cross section of the switching device of FIG. 5.

FIGS. 5 and 6 illustrate a second embodiment. According to this second embodiment of the switching device 50, the indicator stem 8 is radially exterior to the insulator 5.

The indicator stem 8 may comprise a cylindrical portion 31 and a set of fins 32 extending transversally to the cylindrical portion. The fins 32 are disc-shaped. The fins 32 are offset along the cylindrical portion 31 of the indicator stem 11. In the example illustrated, the distance between two consecutive fins 32 is constant.

The indicator stem 8 is here connected to the control fitting 6 by a linking bar 33. The linking bar 33 extends in the transverse direction T. The transverse direction T is here perpendicular to the X-axis and to the Y-axis. The linking bar 33 and the indicator stem 8 can form a one-piece assembly. The indicator stem 8 faces an outer radial surface 37 of the insulator 5. According to one embodiment (not shown), the indicator stem 8 is connected to the mobile electrode 3 by a linking bar 33.

The indicator stem 8 passes through the guide plate 13. The guide plate 13 extends transversally to the indicator stem 8. The guide plate 13 is fastened to the control plate 11.

The guide plate 13 may serve as a visual reference for determining the position of the axial end of the indicator stem 8. Specifically, the length of the portion of the indicator stem 8 that projects beyond the guide plate 13 is directly measurable by an operator, in a visual check.

According to both embodiments, a portion of the indicator stem 8 faces a position sensor 14 that is rigidly linked to the control plate 11. For some types of sensor, such as a Hall effect sensor, the indicator stem 8 comprises a magnetic target 21. The position sensor 14 may be attached to the control plate 11 by an attachment lug 38. According to one variant embodiment (not shown), the position sensor 14 may be rigidly linked to the insulator 5.

Figure 4:
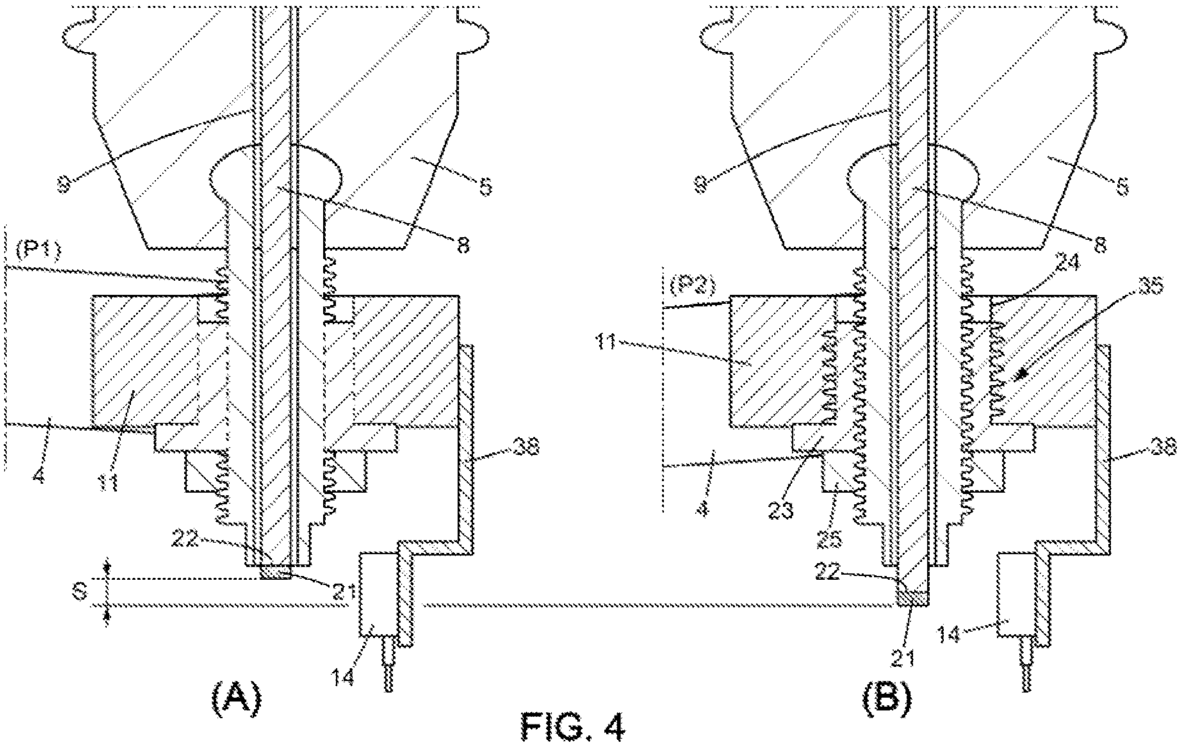
FIG. 4 is another partial view in cross section of the switching device of FIG. 1.

The magnetic target 21 is arranged at an axial end 22 of the indicator stem 8. The magnetic target 21 is, for example, a permanent magnet. The position sensor 14 may be a Hall effect sensor. A magnetoresistive sensor may also be used. As shown schematically in part A of FIG. 4, an axial end 22 of the indicator rod 8 may be flush with an edge of an orifice for the movement of the indicator stem 8 when the actuating lever 4 is in the opening position P1. Part B of FIG. 4 schematically shows the position of the indicator stem 8 when the actuating lever 4 is in the closing position P2. The difference between these two positions is equal to the overtravel S of the actuating lever 4 with respect to the opening distance D1 between the fixed electrode 2 and the mobile electrode 3. This difference is also equal to the variation in the compression of the spring 7 over the closing travel of the actuating lever 4.

Thus, an electronic monitoring unit (not shown) may measure the position of the indicator stem 8 when the actuating lever 4 is in the opening position P1, and also when the actuating lever 4 is in the closing position P2. The difference between the two measured positions is equal to the compressing travel of the spring 7. Calculating the difference between the two positions therefore makes it possible to check that the contact pressure provided by compression of the spring 7 is sufficient. When the measurement is performed via an acquisition chain for the position of a magnetic target 21 secured to the indicator stem 8, an automatic warning signal may be issued when the value found is below a predetermined threshold. A corrective action may thus be taken, such as adjusting the adjustment system 35, for example.

The invention claimed is:

1. A device for switching a medium-voltage electrical circuit, comprising:
   - a vacuum interrupter comprising a fixed electrode and a mobile electrode,
   - an actuating lever linked to the mobile electrode, the actuating lever being mobile between a first position, called an opening position, wherein the mobile electrode and the fixed electrode are separated by an opening distance, and a second position, called a closing position wherein the mobile electrode and the fixed electrode are in contact so as to allow a current to flow through the electrical circuit, the actuating lever moving from the first position to the second position defining a travel of displacement, an insulator linked to the actuating lever, a compression member, exerting a repelling force between the mobile electrode and the insulator, wherein the travel of the actuating lever is greater than the opening distance, the switching device comprising:

an indicator stem mechanically linked to the mobile electrode, which is configured to extend at least partly out of the insulator when the actuating lever is in the closing position, wherein the indicator stem passes through the insulator.

2. The switching device according to claim 1, wherein the indicator stem is electrically insulating.

3. The switching device according to claim 1, comprising a control fitting secured to the mobile electrode, wherein the compression member exerts the repelling force between the control fitting and the insulator so as to press the control fitting against the insulator when the mobile electrode is separated from the fixed electrode.

4. The switching device according to claim 1, wherein the insulator extends along a longitudinal axis, and wherein the indicator stem is parallel to the longitudinal axis.

5. The switching device according to claim 1, wherein the indicator stem is accommodated in a movement channel in the insulator.

6. The switching device according to claim 5, comprising a seal that is radially included between the indicator stem and the movement channel in the insulator.

7. The switching device according to claim 5, wherein the movement channel comprises a first cylindrical portion of diameter, and a second cylindrical portion of diameter, the diameter of the second cylindrical portion being greater than the diameter of the first cylindrical portion, the switching device comprising two seals that are radially included between the indicator stem and the second cylindrical portion, the two seals being axially offset along the indicator stem.

8. The switching device according to claim 1, wherein the insulator is linked to a control plate comprising a pivot extending along an axis transverse to a longitudinal axis, wherein the actuating lever is linked to the pivot of the control plate, wherein the insulator is linked to the control plate by a screw-nut adjustment system configured to adjust a relative position of the insulator with respect to the control plate, so as to adjust the opening distance between the mobile electrode and the fixed electrode when the actuating lever is in the first position, and wherein the indicator stem passes through the screw-nut adjustment system.

9. The switching device according to claim 8, wherein a portion of the indicator stem faces a position sensor that is rigidly linked to the control plate.

10. The switching device according to claim 1, wherein the indicator stem is radially exterior to the insulator.

11. The switching device according to claim 10, wherein the indicator stem comprises a cylindrical portion and a set of fins extending transversally to the cylindrical portion.

12. The switching device according to claim 10, wherein the indicator stem passes through a guide plate.

* * * * *